United States Patent [19]
Robinson, Jr. et al.

[11] Patent Number: 5,495,551
[45] Date of Patent: Feb. 27, 1996

[54] FAST RECOVERY CIRCUIT FOR HEAT PUMP WATER HEATER

[75] Inventors: Glen P. Robinson, Jr., Atlanta, Ga.; Carl C. Hiller, San Ramon, Calif.

[73] Assignee: Electric Power Research Institute, Inc., Palo Alto, Calif.

[21] Appl. No.: 110,548

[22] Filed: Aug. 23, 1993

Related U.S. Application Data

[63] Continuation-in-part of Ser. No. 729,418, Jul. 12, 1991, Pat. No. 5,255,338.

[51] Int. Cl.$^6$ ................................. H05B 3/78; F24H 1/20
[52] U.S. Cl. ..................... 392/451; 392/454; 392/308; 219/510; 165/29
[58] Field of Search .................... 392/451–454, 392/463, 464, 308; 219/510, 494; 165/29; 62/238.6, 238.7; 126/374, 362; 237/2 B

[56] References Cited

U.S. PATENT DOCUMENTS

| | | | |
|---|---|---|---|
| 2,157,910 | 5/1939 | McCormick | 392/463 |
| 3,241,603 | 3/1966 | Nagata | 165/29 |
| 4,540,874 | 9/1985 | Shaffer, Jr. et al. | 62/238.6 |
| 4,543,468 | 9/1985 | Shaffer, Jr. et al. | 62/238.6 |
| 4,740,673 | 4/1988 | Robinson, Jr. | 219/510 |

FOREIGN PATENT DOCUMENTS

| | | | |
|---|---|---|---|
| 8808658 | 11/1988 | WIPO | 392/454 |

*Primary Examiner*—Philip H. Leung
*Assistant Examiner*—John A. Jeffery
*Attorney, Agent, or Firm*—B. J. Powell

[57] ABSTRACT

An external circuit that works in conjunction with the existing tank thermostatic controls to control both a water heating heat pump and the existing resistance elements in a water heater. The existing resistance elements are disabled to allow the heat pump to heat the water unless a large volume of hot water is quickly withdrawn whereupon the upper resistance element is re-enabled to heat the water for a faster recovery rate.

10 Claims, 2 Drawing Sheets

FAST RECOVERY CIRCUIT FOR HEAT PUMP WATER HEATER

CROSS-REFERENCE TO RELATED APPLICATIONS

This application is a continuation-in-part of application Ser. No. 07/729,418 filed Jul. 12, 1991, now U.S. Pat. No. 5,255,338.

BACKGROUND OF THE INVENTION

Because of the better coefficient of performance of heat pumps as compared to electrical resistive heating elements, there has been a movement in recent years to purchase electric resistance hot water heaters and then connect the water heater tank to a heat pump so that the heating was actually performed by the heat pump rather than the electric resistance elements in the water heater itself. This produced a good coefficient of performance while at the same time retained the electric resistance heating elements as a standby. One such arrangement is illustrated in U.S. Pat. No. 4,740,673, issued May 26, 1988, entitled "Dual Control Thermostat Circuit" that allows the conventional upper and lower thermostats to control the operation of the external heat pump.

One of the problems associated with heat pump heaters for water heaters of the type shown in U.S. Pat. No. 4,740,673 is that no provision was made to automatically switch to the resistance heaters when the inherent low instantaneous heating capacity of the heat pump was exceeded after a large consumption of hot water. The result is frequent hot water outages and a long waiting period until the entire tank recovered to a useful water temperature. This problem was caused by the fact that the heat pump typically heats the tank from the bottom up and may require several hours before the temperature at the top of the tank reaches a useful level. In a conventional two resistance heating element water heater, this problem is solved since the upper thermostat and resistance element gives priority to heating the top of the tank before power can be applied to the bottom heating element. This tank top priority heating gives the effect of fast recovery since a small amount of hot water at the top of the tank is quickly available before the full tank is heated.

SUMMARY OF THE INVENTION

These and other problems and disadvantages associated with the prior art are overcome by the invention disclosed herein by providing an external circuit that works in conjunction with the existing tank thermostatic controls to control both the heat pump and the existing resistance elements by allowing the water heater to switch to the resistance heating mode automatically when there is a large drain of hot water and the upper section of the tank begins to cool.

The heat pump water heater control circuit of the invention includes an impedance and a bypass circuit in parallel with each other connecting the existing tank circuit to line voltage through the existing thermostatic switch circuit in the water heater. The impedance has a sufficiently high impedance to reduce the current flow through the resistance heating elements to a level that substantially prevents the heating capability of the electric resistance heating elements when the existing thermostatic switch network in the hot water tank normally associated with the electrical resistance heating elements closes. The impedance controls an operative element to connect the heat pump circuitry to line voltage to operate the heat pump when line voltage is imposed across the impedance. The bypass circuit shorts out the impedance when a sufficiently large volume of hot water is withdrawn from the water tank to cause the temperature in the upper portion of the water tank to drop sufficiently to transfer the upper switch in the thermostatic switch circuit so as to apply power to the upper heating element and the impedance. This re-enables the existing upper resistive heating element and disables the heat pump until the temperature in the upper portion of the tank is raised back to the desired temperature.

These and other features and advantages of the invention will become more clearly understood upon consideration of the following detailed description and accompanying drawings wherein like characters of reference designate corresponding parts throughout the several views and in which:

These figures and the following detailed description disclose specific embodiments of the invention, however, is to be understood that the inventive concept is not limited thereto since it may be embodied in other forms.

DETAILED DESCRIPTION OF ILLUSTRATIVE EMBODIMENTS

Figure 1:
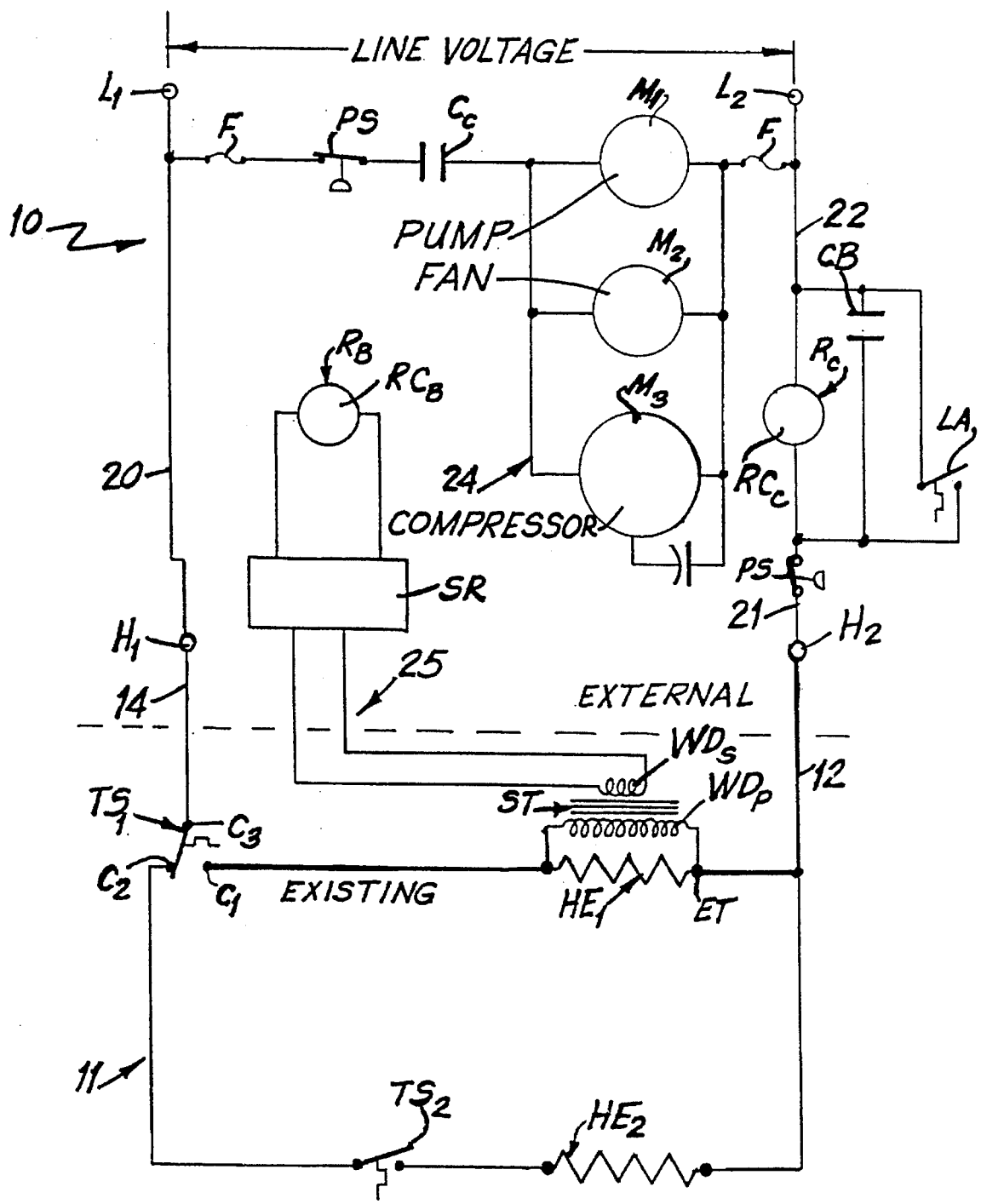
FIG. 1 is an electrical schematic illustrating the control circuit of the invention shown connected to a conventional dual element electric water heater; and, FIG. 2 is a diagrammatic view of a water heater with the invention installed.

Referring to FIG. 1, the heat pump water heater control circuit 10 is connected to an existing tank circuit 11. This allows the circuit 10 to be connected to electric water heater WH (FIG. 2) without having to modify the existing tank circuit 11.

Figure 2:
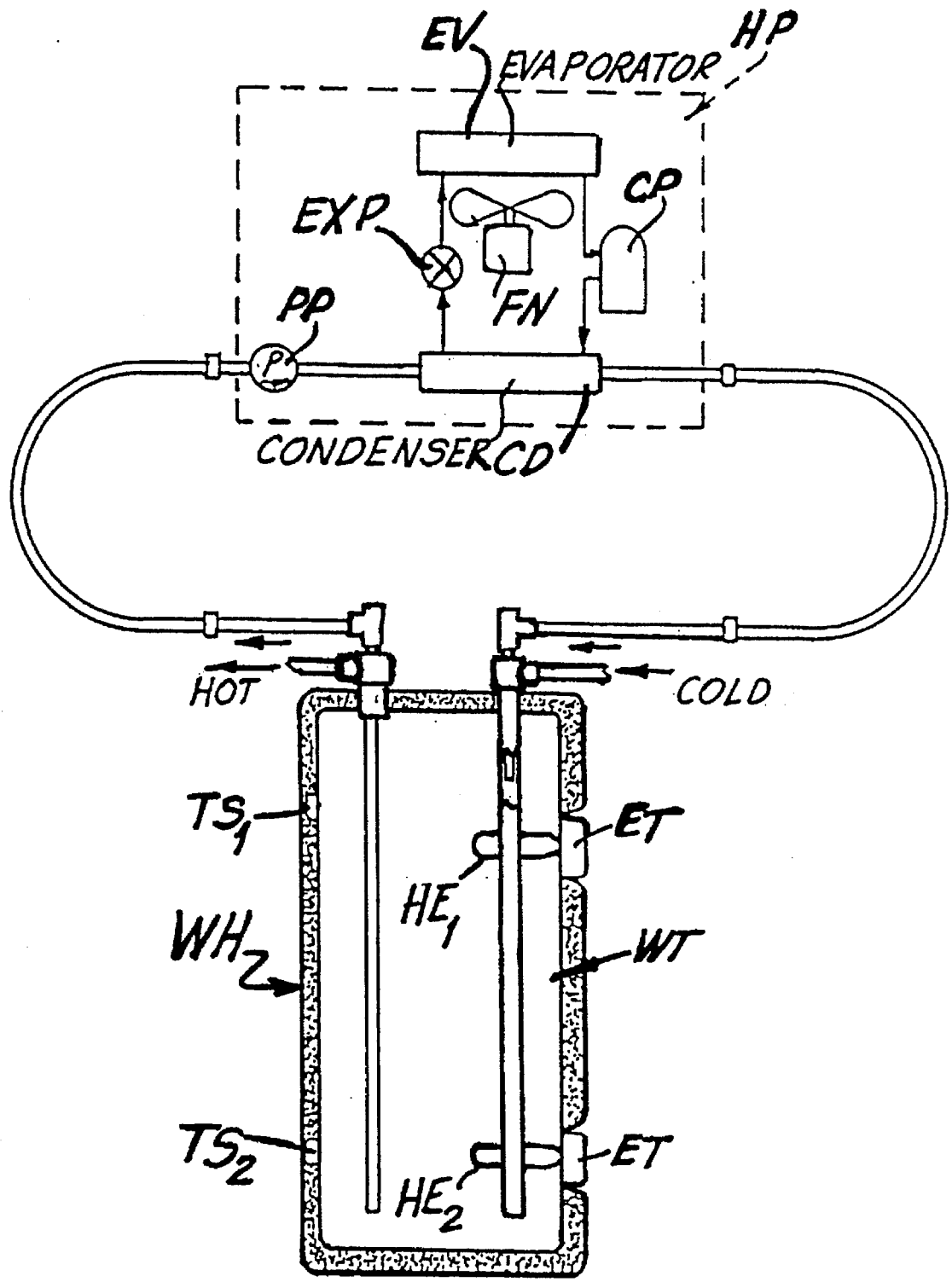

The existing tank circuit 11 serves to connect the upper and lower electrical resistance heating elements $HE_1$ and $HE_2$ respectively in the water tank WT seen in FIG. 2 along with the upper and lower thermostatic switches $TS_1$ and $TS_2$ respectively to line voltage. As seen in FIG. 1, the circuit 11 includes a conductor 12 which is connected to a heater terminal $H_2$ adapted to be connected to one side of line voltage. Conductor 12 is connected to one end of both electrical resistance heating elements $HE_1$ and $HE_2$. The other side of the upper heating element $HE_1$ is connected to contact $C_1$ of the single pole double throw (SPDT) thermostatically operated switch $TS_1$ located on the upper portion of the water tank. The other side of the lower heating element $HE_2$ is connected to one side of the thermostatically operated switch $TS_2$ located on the lower portion of the water tank which in turn is connected to the contact $C_2$ of SPDT switch $TS_1$. The common side $C_3$ of the switch $TS_1$ is connected via conductor 14 to heater terminal $H_1$ adapted to be connected to the other side of line voltage in its originally intended usage. Typically, line voltage is about 230 volts although different line voltages would work just as well. The electrical connections to the heating elements $HE_1$ and $HE_2$ are externally accessible as seen in FIG. 2 and well known in the art.

The heat pump HP seen in FIG. 2 comprises a compressor CP whose output is connected to a condenser CD and whose inlet is connected to an evaporator EV. The refrigerant circuit is completed by an expansion valve EXP connecting the opposite ends of the condenser and evaporator. Water withdrawn from the bottom of the water tank WT through the tank hot water outlet is circulated by a circulation pump PP through the condenser CD to heat the water and then back into the lower portion of the water tank WT through the existing cold water dip tube DT in the tank.

The heat pump water heater control circuit 10 is designed to connect the existing tank circuit 11 to line voltage at line terminals $L_1$ and $L_2$ so that the circuit 10 effectively controls the water heating operation. The circuit 10 serves to disable the heating elements $HE_1$ and $HE_2$ so that the heat pump HP heats the water but re-enables the upper heating element $HE_1$ when large amounts of hot water are withdrawn to increase the recovery rate of the water heater.

The circuit 10 includes wire 20 connecting heater terminal $H_1$ to line terminal $L_1$. The heat pump water heater control circuit 10 also includes wire 21 connecting the heater terminal $H_2$ to one side of a high impedance relay coil $RC_C$ of relay $R_C$. The opposite side of the coil $RC_C$ is connected to the other line terminal $L_2$ via wire 22.

As explained in U.S. Pat. No. 4,740,673, the resistance of the relay coil $RC_C$ is selected so that the current flow therethrough required to operate the relay will be minimal when line voltage is imposed across it. In the particular example, the relay $R_C$ is selected with a coil resistance of about 8,000 ohms whereas the resistance of the heating elements $HE_1$ and $HE_2$ is about 13 ohms. Since there is only about 0.37 volts drop across the heating element being used, essentially full line voltage is applied to the coil $RC_C$ to cause the relay to be energized. Thus, when relay coil $RC_C$ is connected in series with either resistance elements $HE_1$ and $HE_2$, negligible heat is generated in the water by the heating elements but there will be sufficient current flow to operate relay $R_C$. The relay coil $RC_C$ controls normally open contacts $C_C$ that are used to energize the heat pump HP.

The heat pump HP is provided with a heat pump subcircuit 24 which is connected between wires 20 and 22. The subcircuit 24 includes the motor $M_1$ of water pump PP, the motor $M_2$ of the fan FN for the evaporator EV, and the motor $M_3$ for compressor CP connected in parallel with each other between the wires 20 and 22 through the normally open contacts $C_C$ of relay $R_C$. In the particular subcircuit shown, a manual reset, normally closed, high pressure cutout switch PS is in series with the contacts $C_C$ which opens when the refrigerant pressure in the heat pump HP becomes too high to prevent damage to the heat pump. A normally closed manual reset high pressure switch PS can also be installed between the coil $RC_C$ and the heater element $HE_2$ as seen in FIG. 1. The subcircuit 24 may also fused with fuses F.

To take advantage of the faster usable hot water recovery rate by the upper resistance heating element $HE_1$ when a large volume of hot water is withdrawn from the water tank, a bypass subcircuit 25 shorts out the coil $RC_C$ when the upper thermostatic switch $TS_1$ closes contact $C_1$ to effectively disable relay $R_C$ and the heat pump HP while at the same time re-enabling the heating element $HE_1$ as will become more apparent. When the switch $TS_1$ moves back to the contact $C_2$ in response to the water in the upper portion of the water tank being heated, the coil $RC_C$ is again placed in the circuit to disable the heating element $HE_1$ and re-enable the heat pump HP.

A low ambient or defrost thermostat switch LA may also be installed in parallel with relay coil $RC_C$ to short out this coil when ambient air conditions might allow the coil in evaporator EV to freeze. This also allows full power to be supplied to the water heater WH causing it to operate in its conventional resistance water heating mode until the low ambient switch LA returns to its normally open position.

The bypass subcircuit 25 includes a miniature step down transformer ST with a primary winding $WD_P$ connected in parallel with the upper heating element $HE_1$ between the external terminals ET of the element outside the water tank WT. The transformer ST has a relatively high step down ratio and is typically about 10:1. The low voltage secondary winding $WD_S$ of the transformer ST has a sufficiently low voltage that Class 2 wiring can be used to connect it to the input of a sensor SR located in the control panel on the heat pump HP without violating electrical codes. The sensor SR is sufficiently sensitive to be activated when the switch $TS_1$ closes to impose a voltage across the upper heating element $HE_1$ even when the high resistance relay coil $RC_C$ is not shorted out. The sensor SR produces an electrical output when it is activated sufficient to energize the relay coil $RC_B$ of a low voltage bypass relay $R_B$ to energize the relay when the upper thermostatic switch $TS_1$ moves to contact $C_1$ to apply a voltage to the upper heating element $HE_1$ in series with the coil $RC_C$ as will become more apparent. The normally open contacts $C_B$ of the relay $R_B$ are connected across the coil $RC_C$ in parallel with the switch LA. Thus, when the relay $R_B$ is energized, the coil $RC_C$ is shorted out to deactivate that relay and open the contacts $C_C$ to disconnect the heat pump HP from power while at the same time applying full voltage across the upper heating element $HE_1$ to cause it to heat the water. The sensor SR is equipped with a voltage regulator circuit, typically using zener or other suitable diodes, that acts as a voltage limiting device to prevent overloading the sensor SR when full voltage is applied across the heating element $HE_1$ as will become more apparent.

During typical operation in which an insufficient amount of water is withdrawn to close the upper thermostatic switch $TS_1$, the lower thermostatic switch $TS_2$ closes to call for water heating, and coil $RC_C$ of relay $R_C$ is energized to close contacts $C_C$ and energize the compressor CP, pump PP and fan FN. The small current through the coil $RC_C$ produces a negligible voltage drop through the lower heating element $HE_2$ connected in the circuit. Water is circulated through and heated by the heat pump HP until the lower tank thermostatic switch $TS_2$ is satisfied. The coil $RC_C$ is de-energized when the switch $TS_2$ is satisfied to turn off the heat pump circuit 24.

If a sufficiently large amount of hot water is withdrawn from the water tank to cause the contact $C_1$ of the upper thermostatic switch $TS_1$ to close due to the drop of water temperature in the upper portion of the tank WT, the lower thermostatic switch $TS_2$ is disabled and full line voltage is imposed across the upper heating element $HE_1$ and the relay coil $RC_C$. When this happens, a very small current flows through the upper heating element $HE_1$ being limited by the high resistance of coil $RC_C$. This current is typically less than about 0.03 amperes and causes approximately 0.37 volts to appear across the primary of transformer ST. The step down transformer ST drops this voltage to about 0.037 volts which is transmitted to the input of the sensor SR. This signal is amplified sufficiently to energize relay coil $RC_B$ in the bypass relay $R_B$ and close contacts $C_B$. Closing contacts $C_B$ short circuits coil $RC_C$ so that full line voltage (usually 208/230 VAC) is imposed across the upper heating element $HE_1$. The primary side of transformer ST now sees 208/230 volts and transmits a much higher 20–23 volt signal to the sensor ST. However, the sensor SR is prevented from being overloaded with this high voltage by the voltage regulator circuit with the zener or other suitable diodes. Thus, relay $RC_B$ continues closed causing the top of the tank to be heated at its maximum rate until the upper thermostatic switch $TS_1$ is satisfied. The system then returns to the normal heat pump operating mode which is controlled by the lower thermostatic switch $TS_2$.

On a cold start-up, the upper thermostatic switch $TS_1$ will close contact $C_1$ to disable the heat pump circuit 24 and heat the water in the upper portion of the water tank WT until the switch $TS_1$ is satisfied to open contact $C_1$ and close contact $C_2$. This enables the lower thermostatic switch $TS_2$ and de-energizes the bypass relay $R_B$ so that control relay $R_C$ is again energized to disable the heating elements $HE_1$ and $HE_2$. This energizes the heat pump circuit 24 and allows the heat pump HP to heat the rest of the water in the tank WT.

What is claimed as the invention is:

1. A thermostatic control circuit connecting existing electric resistance upper and lower heating elements in an electric hot water heater and a water heating heat pump to line voltage to heat the water in the water heater tank, the resistance heating elements controlled by an existing thermostatic switch network having an upper switch responsive to the temperature of the water in the upper portion of the water tank to power the upper heating element from line voltage and disable the lower heating element in response to the temperature of the water in the upper portion of the water tank dropping below an upper prescribed threshold value, said thermostatic control circuit comprising:

an impedance serially connecting said existing resistance heating elements to line voltage through said existing thermostatic switch network, said impedance having a sufficiently high impedance to reduce the current flow through said existing resistance heating elements to a level to substantially prevent the operation thereof when said existing thermostatic switch network connects the heating elements to line voltage;

auxiliary control means operatively associated with said impedance and responsive to line voltage applied to said impedance to connect said water heating heat pump to line voltage to operate same; and bypass circuit means for shorting out said impedance in response to the upper switch in the existing thermostatic switch circuit applying power to the upper heating element to allow the upper heating element to heat the water in the upper portion of the water heater and to return said impedance to the circuit when the upper switch in the existing thermostatic switch circuit removes power from the upper heating element.

2. The circuit of claim 1 wherein said bypass circuit means includes:

a step down transformer having a primary winding connected in parallel across the upper resistance heating element and a secondary winding producing a detectable voltage output when power is supplied to the upper resistance heating element in series with said impedance;

sensing means connected to said secondary winding for detecting the presence of said detectable voltage output from secondary winding and generating an activation output while said sensing means is detecting said detectable voltage output from said secondary winding; and, secondary relay means operatively connected to said sensing means and activated as long as said activation output is generated by said sensing means, said secondary relay means including means for shorting out said impedance as long as said relay means is activated.

3. The circuit of claim 2 wherein said bypass circuit means further includes:

voltage limiting means connecting said sensor means to said secondary winding on said step down transformer for limiting the voltage across said sensor means when the voltage drop across the upper resistance heating element is increased as said contacts across said relay coil short out said impedance.

4. The circuit of claim 2 wherein said means for shorting out said impedance includes a set of normally open switch contacts connected in parallel with said impedance which are closed when said secondary relay means is activated to short out said impedance while connecting said heating elements directly to line voltage to raise the amount of current flow through the upper heating element to a level to heat the water in the upper portion of the water heater tank while disabling the heat pump and to again open responsive to the upper switch in the existing thermostatic switch circuit removing power from the upper heating element to return the heating of the water in the water heater tank back to the heat pump.

5. The circuit of claim 2 further including low temperature thermostatic switch means connected in parallel with said relay coil, said low temperature thermostatic switch means adapted to close responsive to the ambient temperature around said water heating heat pump dropping below a prescribed minimum value to effectively electrically short out said relay coil and disable said normally open relay switch contacts while connecting the existing resistance heating elements directly to line voltage through said thermostatic switch network as long as the ambient temperature around said heat pump remains below said prescribed minimum value.

6. The circuit of claim 2 further including a normally closed overload switch connected in series with said relay coil and operatively associated with said heat pump to open in the event of an overload in said heat pump and disconnect said relay coil from line voltage to disable said normally open relay switch contacts and said heat pump.

7. A method of disabling the electric resistance upper and lower heating elements in the existing tank circuitry of an electric hot water heater where the existing resistance heating elements are normally powered through an existing thermostatic switch network having a lower switch responsive to the temperature of the water in the lower portion of the water tank to close in response to the water in the lower portion of the water tank dropping below a lower prescribed threshold value and an upper switch responsive to the temperature of the water in the upper portion of the water tank to shift from a first position to a second position in response to the temperature of the water in the upper portion of the water tank dropping below an upper prescribed threshold value, where the lower heating element is connected to line voltage from an electrical power source through the lower switch and the upper switch in series in response to said lower switch being closed and said upper switch being in said first position, where the upper heating element is connected to line voltage from the electrical power source in response to said upper switch being the second position, and where the lower heating element is disabled in response the upper switch being the second position so as to produce an electrical power output upper switch being the second position so as to produce an electrical power output in response to the temperature of water in the lower portion of the water tank being below the lower prescribed threshold level comprising the steps of:

(a) disconnecting the line voltage from the thermostatic switch network in the existing tank circuitry;

(b) reconnecting the thermostatic switch network in the existing tank circuitry to line voltage through an impedance having a sufficiently high impedance value to reduce the current flow through the resistance heating elements to a level to substantially prevent the heating capability of the resistive heating elements responsive to the lower switch in the thermostatic switch network being closed while creating a voltage drop across the impedance above a prescribed threshold value;

(c) connecting the primary winding of a step down transformer in parallel across the upper resistance heating element so that the secondary winding produces a detectable voltage output therefrom when the upper switch in the thermostatic circuit moves to the second position; and d) using the voltage output of the secondary winding to cause the impedance to be shorted out until the upper switch in the thermostatic network moves to the first position.

8. The method of claim 7 further comprising the step of: connecting the voltage to an electric heat pump heating unit connected to the water heater as long as the voltage drop across the impedance exceeds said prescribed threshold value so that the heat pump heating unit heats the water in the hot water tank.

9. The method of claim 7 wherein step d) further comprises the substeps of:

d1) detecting the presence of a voltage output from the secondary winding;

d2) energizing a bypass relay to close the normally open bypass contacts as long as a voltage output is detected from the secondary winding; and, d3) connecting the bypass contacts across the impedance so that the bypass contacts short out the impedance while the bypass contacts are closed.

10. The method of claim 7 further comprising the step of:

e) limiting the voltage output of the secondary winding to prevent damage to the bypass relay.

* * * * *